United States Patent
Lee et al.

(10) Patent No.: US 6,461,541 B1
(45) Date of Patent: Oct. 8, 2002

(54) POLYMER FILM FOR SMART WINDOW

(75) Inventors: Seung Hwa Lee, Seoul; Do Sung Kim, Taejon, both of (KR)

(73) Assignee: Korea Kumho Petrochemical Co., Seoul (KR)

( * ) Notice: Subject to any disclaimer, the term of this patent is extended or adjusted under 35 U.S.C. 154(b) by 139 days.

(21) Appl. No.: 09/599,263

(22) Filed: Jun. 22, 2000

(30) Foreign Application Priority Data

Jun. 29, 1999 (KR) .............................. 99-25169

(51) Int. Cl.⁷ .............................. F21V 9/08; C08L 83/04
(52) U.S. Cl. ........................ 252/582; 252/583; 252/585; 252/586; 524/588; 359/296
(58) Field of Search ................................ 252/582, 583, 252/585, 586; 524/588; 359/296

(56) References Cited

U.S. PATENT DOCUMENTS

| | | | |
|---|---|---|---|
| 5,461,506 A | * 10/1995 | Check, III et al. | ........... 359/296 |
| 5,463,491 A | 10/1995 | Check, III | ................... 359/296 |
| 5,463,492 A | * 10/1995 | Check, III | ................... 359/296 |
| 5,467,217 A | * 11/1995 | Check, III et al. | ........... 359/296 |
| 5,728,251 A | * 3/1998 | Check, III | ............... 156/307.5 |
| 6,114,405 A | * 9/2000 | Zhuang et al. | ................. 522/99 |

FOREIGN PATENT DOCUMENTS

WO    WO 94/11772    5/1994    ........... G02F/26/00

* cited by examiner

Primary Examiner—Robert Dawson
Assistant Examiner—Jeffrey B. Robertson
(74) Attorney, Agent, or Firm—Davidson, Davidson & Kappel, LLC

(57) ABSTRACT

This invention relates to a polymer film for smart window which can optionally modulate the intensity of light passing through a window on the part of users and more particularly, to the polymer film for smart window, prepared in a manner such that a polyalkylacrylate dispersion polymer containing dispersed dichroic particles, so synthesized via reaction between nickel picolinate and polyiodide, are dispersed in a polymethylphenyl-dimethylsiloxane copolymer as a film medium polymer, using dichlorodimethylsilane and dichloromethylphenylsilane as starting monomers where their molar ratios can be modulated. As such, the film medium polymer, so prepared by modulating its molecular weight distribution and dispersion degree of polymer, has an excellent combination of properties such as (1) the compatibility of the polymer to a dispersion polymer can be enhanced, (2) the dichroic particles can be homogeneously dispersed with the size of less than visible light wavelength, and (3) the permeability of light is modulated from the arrangement of particles induced by electric field, thus increasing the transparency of film itself.

2 Claims, No Drawings

POLYMER FILM FOR SMART WINDOW

FIELD OF THE INVENTION

This invention relates to a polymer film for smart window and more particularly, to the polymer film for smart window which can optionally control the intensity of light passing through a window via the rotation of dichroic particles on the part of users.

DESCRIPTION OF THE RELATED ART

In general, the methods of dispersing dichroic particles so as to manufacture a smart window containing dichroic particles are divided into the following two methods: one method is to disperse the particles into liquid, while the other is to disperse the particles into a polymer film.

The first method to prepare the smart window is that particles are dispersed in the selected liquid having similar specific gravity to the particles and placed between the glass plates. However, this method has recognized some disadvantage in that with the lapse of time, particles are precipitated.

The second method is that particles are dispersed in a polymer film and then, this film is placed on the electrode of glass plate. In spite of the fact that unlike the first method, particles are not precipitated, there is a possibility that a dispersion polymer surrounding the particles is dispersed with the heterogeneous size in the film and since the size of dispersed particles has larger than that of visible light wavelength, the film itself becomes opaque.

SUMMARY OF THE INVENTION

To overcome the aforementioned shortcomings such as opaque film and inconstant color due to larger size of dispersed particles than visible light wavelength and heterogeneous dispersion, when dichroic particles are dispersed in a polymer film, an object of this invention is to provide a polymer film for smart window which has excellent properties such as (1) during the polymerization of siloxane polymer used as a film medium polymer, some of methyl groups can be substituted into methylphenyl groups and the molecular weight distribution is reduced less than 1.8 by using chloroform, ethanol and methanol, so that the compatibility between the dispersion polymer and the medium polymer is increased and the particles are homogeneously distributed with the size of less than 1 $\mu$m, (2) when the medium polymer is cross-linked to prepare a film, the film is transparent with constant color, and (3) the colors on the whole part of the film can be homogeneously changed depending on the changes of electric field.

DETAILED DESCRIPTION OF THE INVENTION

To achieve the above mentioned objective, this invention is characterized by a polymer film for smart window, wherein it comprises; a polyalkylacrylate dispersion polymer containing dispersed dichroic particles, so synthesized via reaction between nickel picolinate and polyiodide, are dispersed in a polymethylphenyl-dimethylsiloxane copolymer (dispersion degree of polymer: less than 1.8 and number average molecular weight: between 60,000 to 200,000), a film medium polymer.

This invention is explained in more detail as set forth hereunder.

The polymer film for smart window of this invention is also characterized in that polyalkylacrylate, a dispersion polymer, is dispersed in the polymethylphenyl-dimethylsiloxane copolymer as a film medium polymer and in consequence, dichroic particles surrounded by the dispersion polymer are homogeneously dispersed to the polymer film with the size of less than visible light wavelength, thus increasing the transparency of film itself and maintaining its constant colors.

According to this invention, the polymethylphenyl-dimethylsiloxane copolymer is employed as a medium polymer. First, in order that dichroic particles are dispersed in the polymer film with the size of less than visible light wavelength, the compatibility between the polymethylphenyl-dimethylsiloxane copolymer as film medium polymer and polyacrylate as a dispersion polymer should be carefully considered.

If polymethylsiloxane is independently employed as a film medium, little compatibility between the dispersion polymer and the medium polymer may result in inducing a complete phase separation and on top of that, the particles are distributed with the size of more than 5 $\mu$m so that the film itself become opaque. By contrast, if the compatibility between the dispersion polymer and the film medium polymer is excessively increased, the dispersion polymer surrounding the particles is mixed with the medium polymer and then, the movement of dichroic particles depending on the changes of electric field is restricted so that any functions of smart window do not work.

Therefore, in order that the dispersion polymer is dispersed in the medium polymer with the size of less than visible light wavelength, it is preferred that the medium polymer has a partial compatibility with the dispersion polymer.

In order that the dispersion polymer used for smart window containing dichroic particles is homogeneously dispersed in the polymer film to enhance the transparency of film, while maintaining its suitable size, this invention is designed to meet the following requirements: (1) the compatibility between dispersion polymer and the medium polymer is optimized, (2) the size of the particles is constantly controlled by the variation of the molecular weight distribution of a medium polymer.

Hence, the transparent film provided when the dispersion polymer is dispersed in the film medium polymer with the size of less than visible light wavelength. However, if the two polymers are completely mixed due to increase of their compatibility, the movement of dichroic particles in the film depending on the changes of electric field is restricted According to this invention, to overcome the two drawbacks, methylphenyl group and dimethyl group in the polymethylphenyl-dimethylsiloxane copolymer as a film medium polymer are substituted in the molar ratio of between 1:3 to 1:5. If this is the case, the compatibility between the film medium polymer and dispersion polymer is increased so that the dispersion polymer containing dichroic particles is dispersed with the size of less than 1 $\mu$m, thus making the film transparent.

If the content ratio of the two functional groups in the polymethylphenyl-dimethylsiloxane copolymer deviates the above range, the excessive increase of compatibility between the two polymers induces the absence of phase separation.

According to this invention, the content ratio between methylphenyl group and dimethyl group in the film medium polymer is controlled so that the compatibility between the dispersion polymer and film medium polymer can be controlled.

Meantime, the homogeneous dispersion of dichroic particles can be achieved by controlling the molecular weight distribution of a film medium polymer.

More specifically, when a monomeric mixture of dichlorodimethylsilane and dichloromethylphenylsilane is reacted with water and polymerized as a medium polymer to perform the polymerization of polysiloxanes used as a film medium, some linear polymers having a high molecular weight are generated, while cyclic polymers having a low molecular weight are generated more than 50%. Thus, the polymer has an extremely broad range of molecular weight distribution. If the molecular weight distribution of a film medium polymer during polymerization is not properly controlled, the size of particles is not homogeneously distributed when the film medium polymer is mixed with polyalkylacrylate, a dispersion polymer surrounding the surface of dichroic particles. On the ground of the above reasons, the color of film is inconstant and the arrangement time of particles depending on the applied electric field does not become constant. To overcome this matter, a method of separating the linear polymers, that the reactant is dissolved in chloroform, precipitated using ethanol and methanol and separated the chloroform layer, is used. By use of this method, a polymer is polymerized with the number average molecular weight of more than 50,000, preferably in the range of 60,000~200,000 and molecular weight distribution of less than 1.8. If a polymer having more narrow molecular weight distribution as a film medium, the dispersion polymer surrounding the particles have a constant size.

As mentioned above, the polymer film of this invention is prepared in a manner such that after modulating the molecular weight distribution of the medium polymer, compatibility between the dispersion polymer and the film medium polymer is also modulated and then, the mixture is mixed with polyalkylacrylate as a dispersion polymer, preferably polyneopentylacrylate and cross-linked. Since dichroic particles are homogeneously dispersed in the polymer film, so prepared, with the size of less than visible light wavelength, its film is transparent with constant colors.

This invention is explained in more detail based on the following Examples but is not limited by these Examples.

Manufacturing example 1

35 g of monomeric dichlorodimethylsilane was mixed with 10 g of monomeric dichloromethylphenylsilane and then, 10 g of water was added to the mixture. The reaction was started at the temperature of 0° C. and with the increase of temperature up, to 150° C., the reaction was completed after 6 hours. After chloroform and water were added to the resulting solution, the reactant present in chloroform layer only was filtered. The solvent was distilled under reduced pressure for its removal, thus giving a polymethylphenyl-dimethylsiloxane(molar ratio of 1:5) copolymer. The obtained copolymer was purified on gel permeation chromatography (GPC) and its molecular weight and dispersion degree were measured. As the result, the number average molecular weight was about 70,000 and the dispersity was about 3.7.

The copolymer was again dissolved in chloroform to separate the layer following by the addition of ethanol. After the chloroform layer was separated via separatory funnel, the solvent was distilled under reduced pressure for its removal. The obtained copolymer was purified and its molecular weight and dispersity e was measured. As the result, the number average molecular weight was about 85,000 and the dispersity was about 1.72.

Manufacturing example 2

A polymethylphenyl-dimethylsiloxane copolymer in a molar ratio of methylphenyl group to dimethyl group of 1:4 was prepared in the same manner as Manufacturing example 1, except that 10 g of dichloromethylphenylsilane and 27 g of dichlorodimethylsilane were employed. After the prepared copolymer was purified, the number average molecular weight and dispersity were measured and were shown in the following Table 1.

Manufacturing example 3

The polymethylphenyl-dimethylsiloxane copolymer in a molar ratio of methylphenyl group to dimethyl group of 1:3 was prepared in the same method as Manufacturing example 1, except that 9.9 g of dichloromethylphenylsilane and 20 g of dichlorodimethylsilane were employed. After the prepared copolymer was purified, the number average molecular weight and dispersion degree of it were measured and were shown in the following Table 1.

Comparative manufacturing example 1

30 g of monomeric dichlorodimethylsilane was mixed with 43 g of monomeric dichloromethylphenylsilane and then, 9 g of water was added to the mixture. The reaction was started at 0° C. and with the increase of temperature up to 150° C., the reaction was completed after 6 hours. After chloroform and water were added to the resulting solution, the reactant present in chloroform layer was filtered. The solvent was distilled under reduced pressure for its removal, thus giving a polymethylphenyl-dimethylsiloxane (molar ratio of 1:1) copolymer. The obtained copolymer was purified on gel permeation chromatography(GPC) and its molecular weight and dispersion degree were measured. As the result, the number average molecular weight was about 70,000 and the dispersity was about 4.8.

The copolymer was again dissolved in chloroform to separate the layer following the addition of ethanol. After the chloroform layer was separated via separatory funnel, the solvent was distilled under reduced pressure for its removal. The obtained copolymer was again purified on GPC and its molecular weight and dispersion degree was measured. As the result, the number average molecular weight was about 84,000 and the dispersity was about 1.7.

Comparative manufacturing example 2

The polymethylphenyl-dimethylsiloxane copolymer in a molar ratio of methylphenyl group to dimethyl group of 5:1 was prepared in the same manner as Comparative manufacturing example 1, except that 5 g of dichlorodimethylsilane and 37 g of dichloromethylphenylsilane were employed. After the prepared copolymer was purified, the number average molecular weight and dispersity were measured and were shown in the following Table 1.

Comparative manufacturing example 3

A polymethylphenylsiloxane polymer was prepared in the same manner as Comparative manufacturing example 1, except that 50 g of dichloromethylphenylsilwas mixed with 10 g of water. After the prepared copolymer was purified, the number average molecular weight and dispersity were measured and were shown in the following Table 1.

Comparative manufacturing example 4

A polydimethylsiloxane polymer was prepared in the same manner as Comparative manufacturing example 1, except that 50 g of dichlorodimethylsilane was mixed with 15 g of water. After the prepared copolymer was purified, the number average molecular weight and dispersity were measured and were shown in the following Table 1.

Comparative Manufacturing Example 5

A polymethylphenyl-dimethylsiloxane copolymer in a molar ratio of methylphenyl group to dimethyl group of 1:10 was prepared in the same manner as Comparative manufacturing example 1, except that 40 g of dichlorodimethylsilane was mixed with 2.7 g of dichloromethylphenylsilane and then, 10 g of water was added to the mixture. After the prepared copolymer was purified, the number average molecular weight and dispersity were measured and were shown in the following Table 1.

TABLE 1

| Category | Polymer (molar ratio) | Number average molecular weight | Dispersity of polymer |
|---|---|---|---|
| Manufacturing exmp. 1 | Polymethylphenyl-dimethylsiloxane (1:5) | 85,000 | 1.72 |
| Manufacturing exmp. 2 | Polymethylphenyl-dimethylsiloxane (1:4) | 80,000 | 1.72 |
| Manufacturing exmp. 3 | Polymethylphenyl-dimethylsiloxane (1:3) | 75,000 | 1.72 |
| Comparative manufacturing exmp. 1 | Polymethylphenyl-dimethylsiloxane (1:1) | 84,000 | 1.7 |
| Comparative manufacturing exmp. 2 | Polymethylphenyl-dimethylsiloxane (5:1) | 70,000 | 1.8 |
| Comparative manufacturing exmp. 3 | Polymethylphenylsiloxane | 60,000 | 1.56 |
| Comparative manufacturing exmp. 4 | Polydimethylsiloxane | 65,000 | 1.23 |
| Comparative manufacturing exmp. 5 | Polymethylphenyl-dimethylsiloxane (1:10) | 72,000 | 1.5 |

Example 1

The glass transition temperature of polymethylphenyl-dimethylsiloxane (molar ratio of 1:5) copolymer, so polymerized from Manufacturing example 1 and measured via DSC, was determined at $-112°$ C. The glass transition temperature of polyneopentylacrylate was also determined at $-4°$ C.

A mixture containing 5 g of polymethylphenyl-dimethylsiloxane(1:5) copolymer and 2.5 g of polyneopentylacrylate, dissolved in tetrahydrofuran as a solvent, was mixed with sonication and distilled under reduced pressure to remove the solvent. Then, the glass transition temperature was measured by DSC. The mixed solution was opaque. The glass transition temperature was determined at the two temperatures of $-114°$ C. and $0°$ C., thus resulting in the occurrence of phase separation.

Then, in order to ascertain mixed degree of polymethylphenyl-dimethylsiloxane copolymer and polyneopentylacrylate, the mixed solution was cross-linked for preparing of film and the surface of the prepared film was measured using an electronic microscope. As the result, polyneopentylacrylate was dispersed in the siloxane film with the size of about 1~3.5 $\mu$m.

Based on these results, dichroic particles, which were synthesized using the reaction between nickel picolinate and polyiodide, were dispersed in polyneopentylacrylate as a dispersion polymer. The reactant was mixed with the polymethylphenyl-dimethylsiloxane(1:5) copolymer to prepare it in a form of film. Then, the prepared film was placed between conductive glass plates and power was applied to both electrodes. As the result, the change of the colors on the whole part of film was constant.

Example 2

The glass transition temperature of polymethylphenyl-dimethylsiloxane(molar ratio of 1:4) copolymer, so polymerized from Manufacturing example 1 and measured by DSC, was determined at $-108°$ C. The glass transition temperature of polyneopentylacrylate was also determined at $-4°$ C.

A mixture containing 5 g of polymethylphenyl-dimethylsiloxane(1:4) copolymer and 2.5 g of polyneopentylacrylate, dissolved in tetrahydrofuran as a solvent, was mixed with sonication and distilled under reduced pressure to remove the solvent. Then, the glass transition temperature was measured via DSC. The mixed solution was opaque. The glass transition temperature was determined at the two temperatures of $-108°$ C. and $-2°$ C., thus resulting in the occurrence of phase separation.

Then, in order to ascertain mixed degree of polymethylphenyl-dimethylsiloxane copolymer and polyneopentylacrylate, the mixed solution was cross-linked for preparing of film and the surface of the prepared film was measured using an electronic microscope. As the result, polyneopentylacrylate was dispersed in the siloxane film with the size of about 0.7~2 $\mu$m.

Based on these results, dichroic particles, which were synthesized using the reaction between nickel picolinate and polyiodide, were dispersed in polyneopentylacrylate as a dispersion polymer. The reactant was mixed with the polymethylphenyl-dimethylsiloxane(1:4) copolymer to prepare it in a form of film. Then, the prepared film was placed between conductive glass plates and power was applied to both electrodes. As the result, the change of the colors on the whole part of film was constant.

Example 3

The glass transition temperature of polymethylphenyl-dimethylsiloxane(molar ratio of 1:3) copolymer, so polymerized from Manufacturing example 3 and measured by DSC, was determined at $-101°$ C. The glass transition temperature of polyneopentylacrylate was also determined at $-4°$ C.

A mixture containing 5 g of polymethylphenyl-dimethylsiloxane(1:3) copolymer and 2.5 g of polyneopentylacrylate, dissolved in tetrahydrofuran as a solvent, was mixed with sonication and distilled under reduced pressure to remove the solvent. Then, the glass transition temperature was measured by DSC. The mixed solution was opaque. The glass transition temperature was determined at the two temperatures of $-100°$ C. and $-2°$ C., thus resulting in the occurrence of phase separation.

Then, in order to ascertain mixed state of polymethylphenyl-dimethylsiloxane copolymer and polyneopentylacrylate via surface photograph, the mixed solution was cross-linked for preparing of film and the surface of the prepared film was measured using an electronic microscope. As the result, polyneopentylacrylate was dispersed in the siloxane film with the size of about between 0.1 to 1.0 $\mu$m.

Based on these results, dichroic particles, which were synthesized using the reaction between nickel picolinate and polyiodide, were dispersed in polyneopentylacrylate as a dispersion polymer. The reactant was mixed with the polymethylphenyl-dimethylsiloxane(1:3) copolymer to prepare it in a form of film. Then, the prepared film was placed between conductive glass plates and power was applied to both electrodes. As the result, the change of the colors on the whole part of film was constant.

Comparative Example 1

The glass transition temperature of polydimethylsiloxane polymer, so polymerized from Comparative manufacturing example 4 and measured by DSC, was determined at −125° C. The glass transition temperature of polyneopentylacrylate was also determined at −4°C.

A mixture containing 5 g of polydimethylsiloxane polymer and 2.5 g of polyneopentylacrylate, dissolved in tetrahydrofuran as a solvent, was mixed with sonication and distilled under reduced pressure to remove the solvent. Then, the glass transition temperature was measured by DSC. The mixed solution was opaque. The glass transition temperature was determined at the two temperatures of −125° C. and 0° C.

Then, in order to ascertain mixed state of polydimethylsiloxane polymer and polyneopentylacrylate via surface photograph, the mixed solution was cross-linked for preparing of film and the surface of the prepared film was measured using an electronic microscope. As the result, polyneopentylacrylate was dispersed in the siloxane film with the size of about 10~70 μm.

From these results, it was revealed that in case where polymethylsiloxane only was employed as a film medium polymer, the compatibility was not present between a dispersion polymer and a film medium polymer so that the film itself was opaque due to a complete-phase separation occurred with its distributed particle size of more than 50 μm.

Comparative Example 2

The glass transition temperature of polymethylphenyl-dimethylsiloxane(molar ratio of 1:10) copolymer, so polymerized from Comparative manufacturing example 5, was determined at −117° C. After 5 g of polymethylphenyl-dimethylsiloxane(1:10) copolymer and 2.5 g of polyneopentylacrylate were mixed in the same method as Example 1, the glass transition temperature of the mixture was measured. As the result, it was determined at the two temperatures of −122° C. and 0° C.

Then, in order to ascertain mixed state of polymethylphenyl-dimethylsiloxane copolymer and polyneopentylacrylate via surface photograph, the mixture was cross-linked for preparing of film and the surface of the prepared film was measured using an electronic microscope. As the result, polyneopentylacrylate was dispersed in the siloxane film with the size of about 5~10 μm.

From these results, it was revealed that if the molar ratio of dimethylphenyl group to dimethyl group deviated a certain range in manufacturing the polymethylphenyl-dimethylsiloxane copolymer as a film medium polymer, the size of particles was dispersed up to more than that of visible light wavelength due to a poor compatibility of the copolymer to a dispersion polymer, thus making the film opaque.

Based on these results, dichroic particles, which were synthesized using the reaction between nickel picolinate and polyiodide, were dispersed in polyneopentylacrylate as a dispersion polymer. The reactant was mixed with the polymethylphenyl-dimethylsiloxane (1:10) copolymer to prepare it in a form of film. Then, the prepared film was placed between conductive glass plates and power was applied to both electrodes. As the result, the changes in permeability of light were observed.

Comparative Example 3

The glass transition temperature of polymethylphenyl-dimethylsiloxane (molar ratio of 1:1) copolymer, so polymerized from Comparative manufacturing example 1, was determined at −71° C. After 5 g of polymethylphenyl-dimethylsiloxane(1:1) copolymer and 2.5 g of polyneopentylacrylate were mixed in the same manner as Example 1, a transparent solution was obtained. The glass transition temperature of the solution was determined at the two temperatures of −71° C. and −21° C.

Then, in order to ascertain mixed state of polymethylphenyl-dimethylsiloxane copolymer and polyneopentylacrylate via surface photograph, the transparent solution was cross-linked for preparing of film and the surface of the prepared film was measured using an electronic microscope. As the result, polyneopentylacrylate was completely mixed to the siloxane film.

Based on these results, dichroic particles, which were synthesized using the reaction between nickel picolinate and polyiodide, were dispersed in polyneopentylacrylate as a dispersion polymer. The reactant was mixed with the polymethylphenyl-dimethylsiloxane(1:1) copolymer to prepare it in a form of film. Then, the prepared film was placed between conductive glass plates and power was applied to both electrodes. As the result, little changes in permeability of light were observed.

From these results, it was revealed that if the molar ratio of dimethylphenyl group to dimethyl group deviated a certain range in manufacturing the polymethylphenyl-dimethylsiloxane copolymer as a film medium polymer, there was no phase separation due to the excessive increase in compatibility of two polymers. In consequence, dichroic particles within dispersion polymer were not well rotated so that there was little change in colors.

Comparative Example 4

The glass transition temperature of polymethylphenyl-dimethylsiloxane (molar ratio of 5:1) copolymer, so polymerized from Comparative manufacturing example: 2, was determined at −50° C. After 5 g of polymethylphenyl-dimethylsiloxane(5:1) copolymer and 2.5 g of polyneopentylacrylate were mixed in the same manner as Example 1, a transparent solution was obtained. The glass transition temperature of the solution was determined at the two temperatures of −50° C. and −18° C.

Then, in order to ascertain mixed state of polymethylphenyl-dimethylsiloxane copolymer and polyneopentylacrylate via surface photograph, the transparent solution was cross-linked for preparing of film and the surface of the prepared film was measured using an electronic microscope. As the result, polyneopentylacrylate was completely mixed to the siloxane film.

Based on these results, dichroic particles, which were synthesized using the reaction between nickel picolinate and polyiodide, were dispersed in polyneopentylacrylate as a dispersion polymer. The reactant was mixed with the polymethylphenyl-dimethylsiloxane(5: 1) copolymer to prepare it in a form of film. Then, the prepared film was placed between conductive glass plates and power was applied to both electrodes. As the result, there were no changes in permeability of light.

From these results, it was revealed that as shown in Comparative example 3, if the molar ratio of dimethylphenyl group to dimethyl group deviated a certain range in manufacturing the polymethylphenyl-dimethylsiloxane copolymer as a film medium polymer, there was no phase separation due to the excessive increase in compatibility of two polymers. In consequence, dichroic particles within dispersion polymer were not rotated so that there was no change in colors.

Comparative Example 5

The glass transition temperature of polymethylphenylsiloxane polymer, so polymerized from Comparative manufacturing example 3, was determined at −40° C. After 5 g of polymethylphenylsiloxane polymer and 2.5 g of polyneopentylacrylate were mixed in the same manner as Example 1, a transparent solution was obtained. The glass transition temperature of the solution was determined at the two temperatures of −40° C. and −16° C.

Then, in order to ascertain mixed state of polymethylphenylsiloxane polymer and polyneopentylacrylate via surface photograph, the transparent solution was cross-linked for preparing of film and the surface of the prepared film was measured using an electronic microscope. As the result, polyneopentylacrylate was completely mixed to the siloxane film. Then, the polymethylphenylsiloxane copolymer was cross-linked to prepare it in a form of film.

Based on these results, dichroic particles, which were synthesized using the reaction between nickel picolinate and polyiodide, were dispersed in polyneopentylacrylate as a dispersion polymer. The reactant was mixed with the polymethylphenylsiloxane polymer to prepare it in a form of film. Then, the prepared film was placed between conductive glass plates and power was applied to both electrodes. As the result, there were no changes in permeability of light.

The polymer films for smart window, so prepared from Examples and Comparative examples, were briefly summarized in the following Table 2.

TABLE 2

| Category | Compatibility Between film medium polymer and dispersed polymer | Size of dispersed particle (μm) | Transparency of polymer film |
| --- | --- | --- | --- |
| Example 1 | Compatible | 1.0~3.5 | Transparent |
| Example 2 | Compatible | 0.7~2.0 | Transparent |
| Example 3 | Compatible | 0.1~1.0 | Transparent |
| Comparative Example 1 | Partially Compatible | No observed | Transparent |
| Comparative Example 2 | Partially Compatible | No observed | Transparent |
| Comparative Example 3 | Partially Compatible | No observed | Transparent |
| Comparative Example 4 | Compatible | 10~70 | Completely opaque |
| Comparative Example 5 | Compatible | 5~10 | Opaque |

As described above, this invention has several advantages in: that (1) during the polymerization of siloxane polymer used as a film medium polymer, some of methyl groups can be substituted into methylphenyl groups, thus contributing to the increase of compatibility to polyneopentylacrylate as a dispersion polymer, (2) the molecular weight distribution of polymer is reduced less than 1.8 by using chloroform, ethanol and methanol so that the particles are homogeneously distributed with size of less than 1 μm, (3) when the polymer is cross-linked to prepare a film, the film is transparent with constant color, and (4) the colors on the whole part of the film can be homogeneously changed depending on the changes of electric field.

What is claimed is:

1. A polymer film for smart window comprising a polyalkylacrylate dispersion polymer containing dispersed dichroic particles dispersed in a polymethylphenyl-dimethylsiloxane copolymer, and a polymethylphenyl-dimethylsiloxane copolymer as a film medium polymer, wherein said dichroic particles are synthesized via reaction between nickel picolinate and polyiodide, said polymethylphenyl-dimethylsiloxane copolymer has dispersion degree of less than 1.8, number average molecular weight between 60,000 to 2,000,000, and molar ratio of the methylphenyl siloxane group to dimethylsiloxane group is between 1:3 to 1:5.

2. The polymer film for smart window according to claim 1, wherein the polymethylphenyl-dimethylsiloxane copolymer is prepared in a manner such that a mixture containing monomeric dichlorodimethylsilane and monomeric dichloromethylphenylsilane are polymerized in the presence of water; and then dissolved in chloroform, followed by precipitation using alcohol and separating the chloroform layer.

* * * * *